A. N. TUMLIN.
GIN SAW CLEANER.
APPLICATION FILED APR. 14, 1908.
942,800. Patented Dec. 7, 1909.
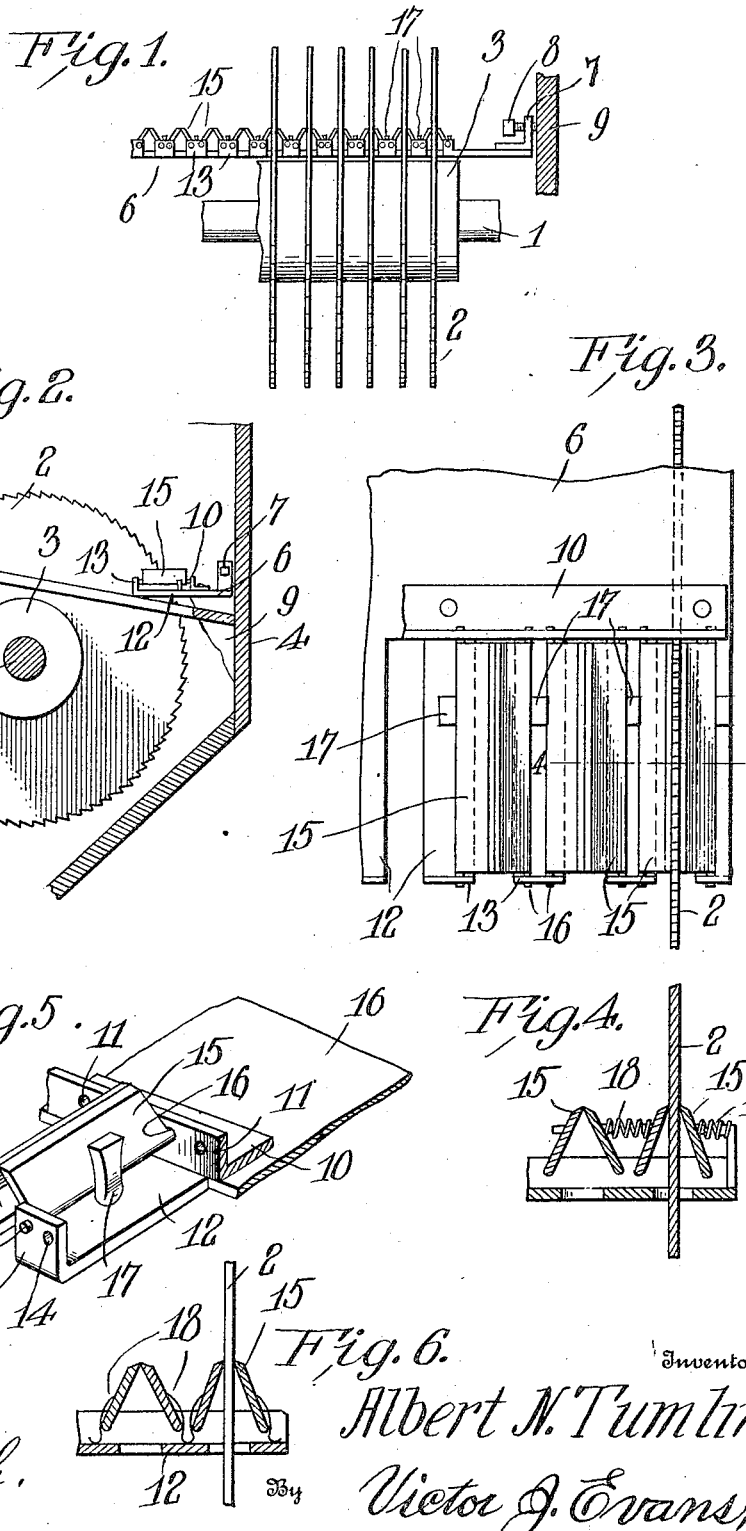

UNITED STATES PATENT OFFICE.

ALBERT NEWTON TUMLIN, OF CAVE SPRING, GEORGIA.

GIN-SAW CLEANER.

942,800.  Specification of Letters Patent.  Patented Dec. 7, 1909.

Application filed April 14, 1908. Serial No. 427,002.

*To all whom it may concern:*

Be it known that I, ALBERT N. TUMLIN, a citizen of the United States of America, residing at Cave Spring, in the county of Floyd and State of Georgia, have invented new and useful Improvements in Gin-Saw Cleaners, of which the following is a specification.

This invention relates to cotton gin saw cleaners, and one of the principal objects of the same is to provide means whereby all saws of a gang may be cleaned at one time and very quickly.

Another object of the invention is to provide a simple device adapted to be applied to the saws of a cotton gin quickly for cleaning the saws, the latter being rotated reversely to the usual direction.

Another object is to provide a series of cleaners which can be quickly applied to position for use on any desired number of saws and quickly removed or thrown out of operative position.

These and other objects may be attained by means of the construction illustrated in the accompanying drawing, in which,—

Figure 1 is a side elevation of a number of gin saws strung upon a shaft and showing my saw cleaner in place for cleaning the blades thereof, a number of cleaners being shown at the left of the saws. Fig. 2 is a section taken at right angles to Fig. 1, and showing a saw and a cleaner in position to clean the blade thereof. Fig. 3 is a plan view of the same. Fig. 4 is a vertical sectional view on the line 4—4, Fig. 3, looking in the direction indicated by the arrow. Fig. 5 is a perspective view of one of the cleaners. Fig. 6 is a sectional view similar to Fig. 4, and showing a modification.

Referring to the drawing for a more specific description of my invention, the numeral 1 designates the gin saw shaft, and 2 are the saws separated upon the shaft by means of the disks 3 and clamped in place at the ends in the usual or any suitable manner. The gin saws are usually mounted in a suitable hopper 4 provided with a guide 5, and to this hopper in any suitable manner I attach my saw cleaner. As shown in Fig. 2, I utilize a base plate 6 provided with an apertured lug 7 through which a set screw 8 passes, said set screw serving to connect the cleaner to a supporting bar 9. Connected to the bar 6 is an angle iron plate 10 provided with a series of holes 11, and extending outward from the plate 6 is a pair of spaced members 12 provided with upturned lugs 13, said lugs having holes 14 therein which aline with the holes 11 in the angle iron plate 10. The cleaner blades 15 are provided with trunnions 16 projecting from the opposite ends near one edge thereof, said trunnions adapted to project through the holes 11 and 14.

To hold the blades 15 in proper relation to operate upon opposite sides of the saw blade I may use a wedge-shaped stop 17, as shown in Figs. 1, 3, 4, and 5, or in lieu of these wedge-shaped stops I may utilize a spring 18 to hold the blades 15 up to the saw.

The operation of my invention may be briefly described as follows: Whenever it is required to clean the saws of the gin the cleaner may be moved down into the position shown in Figs. 1 and 2, and the saw shaft 1 is reversed, the blades 15 scraping the lint and other matter from the saws and cleaning the same at one reverse revolution. Any number of saws may be cleaned at one time, depending upon the number of the cleaners used.

My invention is of simple construction and operates efficiently for its purpose, saves time and labor and can be manufactured at slight cost and applied to any character of gin saw.

Having thus described the invention, what is claimed as new, is:—

The herein described cotton gin saw cleaner comprising a base plate having a pair of spaced members extending therefrom and lugs turned up from the outer ends of said members, an angle iron plate secured to the base plate, cleaner blades provided with pintles projecting from their opposite ends and at their lower sides, said blades being pivoted in the lugs and the angle iron plate, said blades adapted to extend across the teeth of a gin saw at opposite sides thereof for cleaning said saw, and stops connected to said arms for limiting the spreading action of said blades.

In testimony whereof I affix my signature in presence of two witnesses.

ALBERT NEWTON TUMLIN.

Witnesses:
 ROSCOE J. SPENCE,
 J. LEO. BAKER.